May 14, 1968 D. W. DOUGLAS 3,383,513

ELECTRIC KEY-CARD SYSTEM WITH A PLURAL PHOTOELECTRIC CELL BRIDGE CIRCUIT

Filed March 22, 1965

DAVID W. DOUGLAS
INVENTOR.

BY Beehler & Arant

ATTORNEYS 3,383,513
ELECTRIC KEY-CARD SYSTEM WITH A PLURAL PHOTOELECTRIC CELL BRIDGE CIRCUIT

David W. Douglas, Sherman Oaks, Calif., assignor to Wendell L. Thompson, Burbank, Calif.

Filed Mar. 22, 1965, Ser. No. 441,478
5 Claims. (Cl. 250—208)

This invention relates to an electronic key-card system.

A system utilizing an identification card, typically of the type carried in the owner's wallet but for purposes supplementary of identification, is disclosed in my Patent No. 3,029,345 for actuating a lock mechanism, the card itself being in fact a substitute for the usual key. The present invention comprises an improvement of such a key-card system by including among others the novel features for detecting fraudulent cards and for enabling a key-change through readjustment of the circuit parameters whereby a card of different light transmission characteristics may replace the previous one to open the lock.

It is therefore an object of the invention to provide an electronically controlled key-card system.

It is another object of the invention to provide a system capable of operating a lock mechanism whenever a card having prescribed light transmission characteristics is presented thereto.

Another object of the invention is to provide electronic circuit means for actuating a lock mechanism whenever the light transmission characteristics of two preselected portions of an identification card substantially equal predetermined values.

Still another object of the invention is to provide a key-card system in which the circuit parameters necessary to actuate the lock mechanism may be readily changed to allow a new card having different light transmission characteristics to be substituted for the old one.

These and other objects and features of the invention will be more readily understood from the following description taken in conjunction with the accompanying drawing in which.

Figure 1:
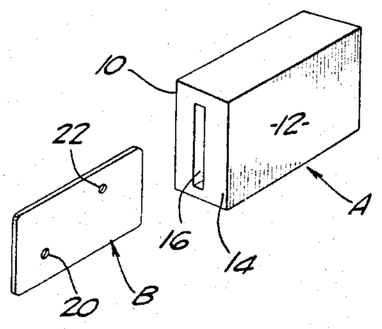
FIGURE 1 shows in perspective a typical slotted control housing adapted to receive an identification card in accordance with the invention.

Referring now to FIGURE 1, there is shown a control housing A in which the key-card system of the present invention may be mounted. The housing A includes a first side portion 10 parallelling a second side portion 12 to form an end portion 14 containing a slot 16. The slot 16 is capable of receiving an identification card B suitably formed from, for example, pigmented cellulose acetate. A colored coating preferably other than red or black may be applied or imprinted on either or both sides of card B at pre-selected areas or portions thereof. For descriptive purposes, consider a portion 20 as representative of the card B and a portion 22 as representative of card B plus the coating or spot which further attenuates the passage of light relative to the portion 20 of card B.

Figure 2:
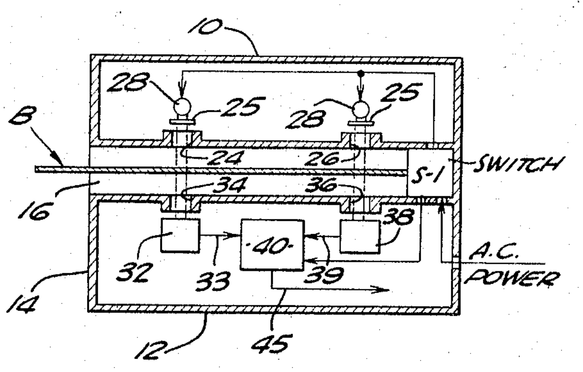
FIGURE 2 is a cross-sectional view of the card disposed in the housing of FIGURE 1 and schematically illustrates one arrangement of the circuit elements of the invention.

FIGURE 2 shows card B fully inserted in the housing A thereby actuating a switch S–1 to connect the system to a source of electrical power, not shown. Two openings 24 and 26 communicating with the slot 16 are provided in the first side portion 10; two additional openings 34 and 36, aligned with the openings 24 and 26 respectively and also communicating with the slot 16, are similarly provided in the second side portion 12.

A light source 28 is also provided in side portion 10 adjacent each of the openings 24 and 26. The single lamp and mirror combination disclosed in my above referenced patent may be used in place of the light source 28 if desired.

A filter 25 which may be an ordinary color filter may be disposed between each of the openings 24 and 26 and their associated light source 28. I prefer to use invisible light; therefore, the filter used is one that rejects all light energy other than that falling within the near infrared region. By using invisible light, mere inspection will not reveal the operating principle of the invention nor will it enable one to easily determine the exact location of the openings in either side portion 10 or 12 of the housing A and hence the relative position of the preselected portions 20 and 22 in the card B.

In the second side portion 12, two detectors 32 and 38 are provided, each mounted adjacent the openings 34 and 36 respectively. With this arrangement, light having a wavelength falling within the near infra-red region, as for example, 800 millimicrons, leaves the openings 24 and 26, passes through the card B and then through the openings 34 and 36 respectively, and finally impinges, attenuated in different amounts by the portions 20 and 22 of the card B, upon the respective detectors 32 and 38.

Each of the detectors 32 and 38 forms an arm of an AC bridge circuit, to be described. This is shown diagrammatically in FIGURE 2 by connecting the detectors 32 and 38 via leads 33 and 39 respectively to a block 40 representative of the detection circuit shown and to be described in conjunction with FIGURE 3. Likewise, an arrow 45 extending from the block 40 is representative of the signal developed by the detection circuit of FIGURE 3 whenever the correct identification card B is presented thereto.

Figure 3:
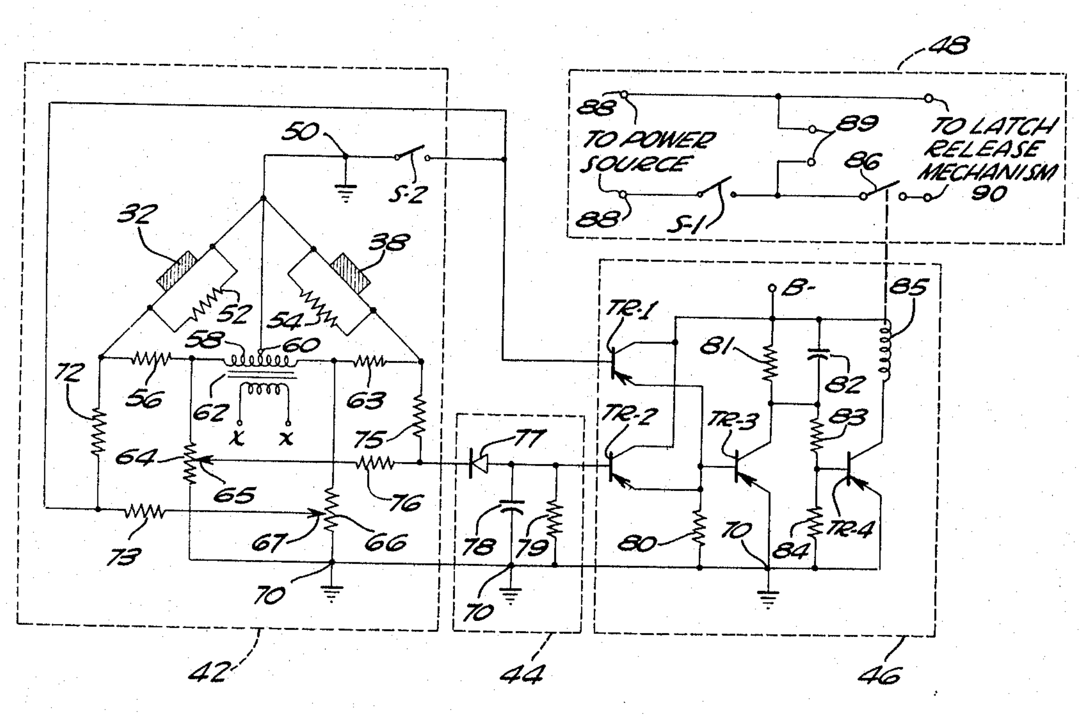
FIGURE 3 is a schematic diagram of the detection circuit of the invention.

In FIGURE 3, the schematic diagram of the detection circuit is shown for descriptive purposes to comprise a bridge circuit 42, a fraudulent card detecting circuit 44, a gating circuit 46, and a lock actuating circuit 48.

In the bridge circuit 42, detectors 32 and 38 form as stated above separate arms of an AC bridge, one terminal of each detector being coupled to ground reference potential at a terminal 50. Photo-resistors of the cadmium sulfide type preferably are used for detectors 32 and 38 and are shunted by resistors 52 and 54 respectively to prevent either arm from becoming a virtual open circuit. A series circuit combination, connected between the ungrounded terminals of detectors 32 and 38, completes the AC bridge and comprises a first resistor 56, a secondary winding 58 of a power transformer 62, and a second resistor 63 substantially similar to resistor 56. The winding 58 supplies AC power preferably at reduced RMS for energizing the bridge and includes a center tap 60 which is connected to ground potential at terminal 50.

A first voltage dividing network comprising a potentiometer 64 is connected between ground at a terminal 70 and the junction of winding 58 and resistor 56; a second voltage dividing network comprising a potentiometer 66 is similarly connected between ground at terminal 70 and the junction of winding 58 and resistor 63. Potentiometers 64 and 66 each includes a movable contact 65 and 67 respectively.

A first summing network comprises resistors 72 and 73 tied together at one end to form a junction C; the other end of resistor 72 is connected at the junction of resistors 52 and 56, and the other end of resistor 73 is connected to movable contact 67 of potentiometer 66. A second summing network comprises resistors 75 and 76 similarly tied together at one end to form a junction D; the other end of resistor 75 is connected at the junction of resistors 54 and 63, and the other end of resistor 76 is connected to movable contact 65 of potentiometer 64.

At this point, consider the card B, having different light transmission characteristics at portions 20 and 22 thereof, positioned in housing A as shown in FIGURE 2. Since switch S–1 is closed, both the transformer 62 and the light sources 28 are energized. AC voltages of different amplitudes and opposite phase representative of the light transmission characteristics of the portions 20 and 22 are developed across the detectors 32 and 38 respectively. By adjusting potentiometer 66, a voltage of an amplitude equal to that developed across detector 32, but of opposite phase, is available at tap 67. These two voltages, the one developed across detector 32 and the one available at tap 67, are summed through resistors 72 and 73. The result is a voltage at junction C, when like summing resistors 72 and 73 are used, having a zero instantaneous amplitude. By a similar adjustment of potentiometer 64, the voltage developed across detector 38, represenative of the card plus the spot as stated above, may be balanced out by summing through like resistors 75 and 76 a voltage of like amplitude but again of opposite phase that is available at tap 65. This results in an instantaneous voltage of zero amplitude at the junction D. The above is essentially the procedure to be followed for adjusting the bridge to properly respond to the card currently chosen to actuate the system.

The signals appearing then at the junctions C and D comprise the output of the bridge circuit 42. Only the signals appearing at junction C, however, are fed directly to the gating circuit 46. The signals appearing at junction D are first fed to the fraudulent card detecting circuit 44 where only certain components are accepted, the remaining rejected.

The fradulent card detecting circuit 44 comprises a diode 77 connected at its cathode to junction D and at its anode to a junction E. A filter circuit comprising a capacitor 78 and a resistor 79 connected in parallel therewith is coupled between junction E and the ground terminal 70. With this arrangement, only the negative portion of any AC signal appearing at junction D is passed and filtered to develop a negative DC voltage at junction E.

The input terminals of the gating circuit 46 to which the signals appearing, if at all, at junctions C and E are coupled comprise the base terminals of first and second transistors TR–1 aund TR–2 connected in the circuit as emitter followers. Each of the collectors of transistors TR–1 and TR–2 is connected to a $B^-$ voltage source, not shown. The emitters of transistors TR–1 and TR–2 are first tied together and then connected to ground at terminal 70 through a resistor 80. Thus signals appearing at either or both junctions C and E are passed through emitter followers TR–1 and TR–2 and subsequently mixed or developed across the resistor 80.

The base of a third transistor TR–3, which functions as an OR gate, is in turn coupled to the emitters of transistors TR–1 and TR–2 at a junction F. In other words, the signals developed across the resistor 80 are fed to the OR gate at the base of transistor TR–3. Its emitter is connected directly to ground at terminal 70 and its collector is coupled to $B^-$ through a collector load comprising a resistor 81 and a paralleling capacitor 82. Connected between ground terminal 70 and the collector of transistor TR–3, identified as junction G, is a series biasing circuit comprising resistors 83 and 84.

The base of a fourth transistor TR–4 is connected at the junction of resistors 83 and 84; the emitter and the collector of transistor TR–4 are respectively coupled to ground at terminal 70 and to $B^-$ through a relay coil 85.

In operation, the OR gate TR–3 will be cut off permitting transistor TR–4 to conduct thus energizing the relay coil 85 whenever a zero voltage signal appears at the base of emitter followers TR–1 and TR–2 thus biasing these transistors to cut-off. But, when either of the emitter followers TR–1 and TR–2 are put in a conductive state by the presence of a voltage at their respective base, transistor TR–3 will conduct and inhibit transistor TR–4 from conducting to prevent relay coil 85 from being energized.

Each of the transistors used in the gating circuit 46 is zero biased; each is of the P-N-P type although with minor obvious changes in the circuit N-P-N type transistors may be used. An example of a suitable P-N-P type transistor for use in the gating circuit 46 is the 2N217 transistor.

Figure 4:
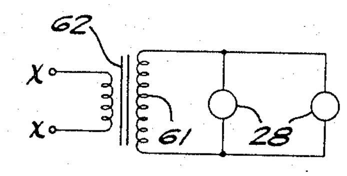
FIGURE 4 is a schematic diagram of a suitable circuit for energizing the light source shown in FIGURE 2.

The lock actuating circuit 48 comprises a series loop circuit which includes normally opened switches S–1 and 86, receiving terminals 88 for power from an AC source not shown, and a latch release mechanism 90, also not shown. The circuit 48 also includes terminals 89 for supplying AC power to the transformer 62 of FIGURE 3 and to the light sources 28 as shown in FIGURES 2 and 4. The $B^-$ voltage may also be developed by a conventional power supply circuit, not shown, from AC power available at terminals 89. With this arrangement, the power necessary to operate the system is supplied only in the event switch S–1 is closed by the proper insertion of card B in housing A. When card B happens to be an identical one to which the bridge circuit 42 has been adjusted as pointed out above, relay coil 85 will be energized and switch 86 closed permitting power available at receiving terminals 88 to be applied to the latch release mechanism 90 to open the lock.

In FIGURE 4, the light sources 28 of FIGURE 2 are shown connected in parallel to another secondary winding 61 of the transformer 62. AC power from the receiving terminals 88 is supplied by a cable, not shown, to terminals *x—x* on the primary side of transformer 62 whenever switch S–1 is closed as described above.

A manually operated switch S–2, reference FIGURE 3, is provided to clamp the base of transistor TR–1 to ground. This facilitates the adjusting of potentiometers 64 and 66 as is required to re-key the system to any other desired card. After closing switch S–2, assuming a desired key-card B–1 is positioned properly in the housing A, potentiometer 64 is adjusted to bias transistor TR–2 to cut-off. This conditon is achieved when the latch release mechanism 90 becomes operaitve. Stated differently, position movable tap 65 to the center of its range of travel which results in energizing the relay coil 85. Switch S–1 may now be opened and is to remain open thereafter. Next, adjust potentiometer 66 to again cause the latch release mechanism 90 to be actuated as occurred previously when adjusting potentiometer 64. The movable tap 67 should also be centered within its operable range as was done when positioning tap 65. At this point, the system is in proper adjustment and will respond to any and all cards having the light transmission characteristics of card B–1 to open the lock utilizing the invention.

Suppose now it is attempted to operate the system with a card B–2 similar in all respects to card B–1 except that either the location or the light transmission characteristics of that portion of card B–2 which is analogous to portion 22 of card B in FIGURE 1 is substantially different relative to the card B–1. In this case, a voltage appears only at junction D and is half-wave rectified and filtered in the fraudulent card detecting circuit 44 to produce a negative DC voltage at junction E. Emitter follower TR–2 conducts and in turn causes transistor TR–3 to conduct thereby rendering transistor TR–4 non-conductive. The relay coil 85 cannot be energized, the switch 86 therefore stays open preventing power distribution to the latch release mechanism 90, and the lock remains secured.

Suppose now another card B–3 is inserted, one entirely dissimilar to card B–1 except that at a portion analogous to portion 22 of card B in FIGURE 1, the light passing through the card B–2 and impinging upon detector 38, reference FIGURE 3, just so happens to develop an AC voltage of the same amplitude as developed by the card B–1. In this event, the voltage appearing at junction D is completely balanced out against the voltage available at tap 65, meaning that a zero instantaneous voltage appears at junction E to bias emitter follower TR–2 to cutoff. However, the voltage developed across detector 32 is other than desired and after summing with the voltage taken from tap 67, a net voltage remains causing emitter follower TR–1 to conduct. Thus, as with card B–2, transistor TR–3 conducts inhibiting transistor TR–4 from conducting and again the relay coil 85 cannot be energized, meaning the lock also remains secured.

Finally, consider a card B–4 dissimilar in all respects to card B–1 without any exceptions but a card which happens to have such light transmission characteristics that the voltages developed across detectors 32 and 38 are of equal amplitude, though opposite in phase. In such cases, the instantaneous voltage difference between junctions C and D is zero, a condition which would, minus the fraudulent card detecting circuit 44, open the lock. The difference to be noted between the voltages developed across the detectors 32 and 38 in the case of card B–1 and card B–4 is that in the former these voltages were precisely balanced out in a summing network against voltages taken from a voltage dividing network extending from the opposite side of the bridge in order to get a voltage of like amplitude but 180 degrees out of phase. In the case of card B–4, the voltages developed across the detectors 32 and 38 are not completely balanced out as in the case of card B–1; rather, after summing there remains on junctions C and D voltages of equal amplitude and opposite phase. Now, by converting the AC voltage appearing at junction D to a DC voltage at junction E, this otherwise operative condition is eliminated and both emitter followers TR–1 and TR–2 conduct to develop a voltage across resistor 80 that has both an AC component as well as a DC component. As a result, transistor TR–3 conducts inhibiting transistor TR–4 from conducting and again relay coil 85 cannot be energized to close switch 86. Therefore, power is unavailable to latch release mechanism 90 and the lock remains secured. In fact, any card which happens to possess characteristics similar to card B–4, appropriately termed a fraudulent card since they develop voltages equal in amplitude and opposite in phase across junctions C and D which would, but for the fraudulent card detecting circuit 44, open the lock, such cards are now readily detected and fail in use to open any lock utilizing the present invention.

Although my invention is fully capable of achieving the results and providing the advantages hereinbefore mentioned, it is to be understood that it is merely the presently preferred embodiment thereof, and that I do not mean to be limited to the details of construction above described other than as defined in the appended claims.

I claim:

1. An electronic circuit adapted to respond to a predetermined condition of relative intensity values of a pair of light beams, said circuit comprising, a pair of photo-resistors for receiving corresponding ones of said light beams; resistive circuit means having two output terminals and coupled to said photo-resistors to provide an electrical bridge circuit; means for exciting said bridge circuit with an AC voltage; summing means coupled to said circuit means to produce an AC output voltage of substantially zero amplitude at each of said terminals upon the occurrence of said predetermined condition; gating means coupled to said output terminals and adapted to produce an output signal in response to a zero output voltage at each of said terminals; and lock-opening means operable in response to said output signal.

2. A key-card system comprising a housing structure having a slot for receiving an identification card; an identification card adapted for insertion within said slot; light source means disposed within one side of said housing structure for generating a pair of invisible light beams directed towards corresponding predetermined portions of said card when inserted in said slot; electric circuit means disposed within the other side of said housing structure and including detector means operable in response to energy received from said light beams to develop two AC signals each representative of the light transmission characteristics of one of the predetermined portions of said card; means for converting one of said AC signals to a DC signal, and gating means adapted to produce an output signal when said DC signal and the other of said AC signals are both substantially zero in amplitude; and lock-opening means coupled to said electric circuit means and operable in response to said output signal.

3. A key-card system comprising a housing structure having a slot for receiving an identification card; an identification card adapted for insertion within said slot; light source means disposed within one side of said housing structure for generating a pair of invisible light beams directed towards corresponding predetermined portions of said card when inserted in said slot; a pair of photo-resistors disposed within the other side of said housing structure and adapted to receive corresponding ones of said light beams; electric circuit means associated with said photo-resistors including an AC bridge circuit for producing first and second AC voltages representative of the relative light intensities received by said photo-resistors, means coupled to said bridge circuit for summing predetermined voltages of opposite phase to said first and second AC voltages to produce third and fourth AC voltages, means for converting said fourth AC voltage to a DC voltage; gating means for receiving said third AC voltage and said DC voltage; gating means for receiving said third AC voltage and said DC voltage and operable when such voltages are substantially zero to produce an output signal; and lock-opening means coupled to said electric circuit means and operable in response to said output signal.

4. An electronic circuit adapted to respond to a predetermined condition of relative intensity values of a pair of light beams, said circuit comprising, a pair of photo-resistors for receiving corresponding ones of said light beams; resistive circuit means having first and second output terminals and coupled to said photo-resistors and including an electrical bridge circuit; source means coupled to said circuit means for supply an AC voltage to said bridge circuit; summing means coupled to said circuit means to produce at said terminals an AC output voltage of zero amplitude upon the occurrence of said predetermined condition; filter means coupled to said second output terminal for converting to a DC voltage the AC voltage developed by said resistive circuit means upon the occurrence of a condition other than said predetermined condition; gating means including a first transistor coupled to said resistive circuit means, a second transistor coupled to said filter means, a third transistor coupled to said first and second transistors and a fourth transistor coupled to said third transistor, said first and second transistors being disposed in a non-conductive state upon the occurrence of said predetermined condition to bias said third and fourth transistors to a non-conductive and a conductive state respectively, said fourth transistor being adapted to produce an output signal when disposed in said conductive state; and lock-opening means operable in response to said output signal.

5. An electronic circuit adapted to respond to a predetermined condition of relative intensity values of a pair of light beams, said circuit comprising, a pair of photo-resistors for receiving corresponding ones of said light beams; resistive circuit means coupled to said photo-resistors to provide an electrical bridge circuit; a power source coupled to said resistive circuit means for supplying an alternating voltage to said bridge circuit, said bridge circuit being adapted to produce first and second bridge output voltages of opposite phase upon the occurrence of said predetermined condition; summing means coupled to said resistive circuit means and including first and second output terminals and voltage divider means for providing first and second reference voltages of adjustable amplitude and opposite phase to produce when summed respectively with said first and second bridge output voltages an AC voltage of substantially zero amplitude at each of said output terminals; filter means coupled to said second output terminal for converting to a DC voltage the AC voltage developed by said resistive circuit means upon the occurrence of a condition other than said predetermined condition; gating means including a first transistor coupled to said resistive circuit means, a second transistor coupled to said filter means, a third transistor coupled to said first and second transistor and a fourth transistor coupled to said third transistor, said first and second transistors being disposed in a non-conductive state upon the occurrence of said predetermined condition to bias said third and fourth transistors to a non-conductive and a conductive state respectively, said fourth transistor being adapted to produce an output signal when disposed in said conductive state; and lock-opening means operable in response to said output signal.

References Cited

UNITED STATES PATENTS

| | | | |
|---|---|---|---|
| 3,029,345 | 4/1962 | Douglas ---------- | 250—210 X |
| 3,221,304 | 11/1965 | Enikeiff et al. ------ | 250—206 X |

JAMES W. LAWRENCE, *Primary Examiner.*

C. R. CAMPBELL, *Assistant Examiner.*